United States Patent
Rosenfeld (10) Patent No.: US 6,892,055 B2
(45) Date of Patent: May 10, 2005

(54) RADIO STATION

(75) Inventor: Josi Rosenfeld, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 441 days.

(21) Appl. No.: 10/219,419

(22) Filed: Aug. 15, 2002

(65) Prior Publication Data

US 2003/0060166 A1 Mar. 27, 2003

(30) Foreign Application Priority Data

Aug. 31, 2001 (GB) .............................. 0121083

(51) Int. Cl.$^7$ ........................ H04B 1/10; H04B 7/185
(52) U.S. Cl. .................... 455/65; 455/296; 455/303; 455/506; 375/346; 375/349; 342/357.02
(58) Field of Search .................. 455/65, 63.1, 67.11, 455/67.14, 504, 506, 296, 303, 304, 273, 275, 276.1, 281; 375/346, 349, 150; 342/357.01, 357.02, 357.04, 450, 453

(56) References Cited

U.S. PATENT DOCUMENTS

| | | | | |
|---|---|---|---|---|
| 5,095,535 A | * | 3/1992 | Freeburg ................. | 455/278.1 |
| 5,615,232 A | * | 3/1997 | Van Nee .................... | 375/346 |
| 6,073,032 A | * | 6/2000 | Keskitalo et al. ........... | 455/561 |
| 6,417,805 B1 | * | 7/2002 | Hershey et al. ............. | 342/453 |
| 6,541,950 B2 | * | 4/2003 | Townsend et al. ....... | 324/76.14 |
| 6,571,082 B1 | * | 5/2003 | Rahman et al. .......... | 455/67.11 |

OTHER PUBLICATIONS

"Performance Evaluation of the Mulitpath Estimating Delay Lock Loop", B. Townsend, D.J.R. van Nee, P. Fenton, and K.Van Dierendonck, Proc of the Institute of Navigation National Technical Meeting, Anaheim, California, Jan. 18–20, 1995, pp. 227–283.

"Conquering Multipath: The GPS Accuracy Battle", L.R. Weill, GPS World, Apr. 1997.

* cited by examiner

Primary Examiner—Duc M. Nguyen (57) ABSTRACT

A radio station (10) in which the value of parameters for a model of a received multipath signal are estimated, the model comprising a value representative of the perpendicular distance between the plane of the reflecting surfaces (40, 50) and the radio station. This perpendicular distance may be measured from the round trip delay of a sounding signal transmitted by the radio station. The amount of computation is reduced by applying constraints to the parameters, and these constraints may comprise this perpendicular distance. The constraints may also be a function of parameters such as the path length, angle of arrival or amplitude of the direct path signal, and the amplitude of reflections of the sounding signal. The values of the parameters may be estimated initially by analysis of the received signals, followed by a parameter estimation process. The values of the resulting parameters are exploited in applications such as ranging, location or equalisation.

18 Claims, 5 Drawing Sheets

RADIO STATION

The present invention relates to a radio station that receives a signal via more than one propagation path and has application to, for example, radio stations that implement processes that can benefit from information characterising the multipath properties of a radio channel or of a received radio signal. Such processes include ranging, location determination, and equalisation of signals.

In a multipath environment, a radio signal is reflected from reflecting surfaces and is received via more than one propagation path. The various components of the signal received via different paths have different amplitudes, phases and delays, which can make the information extracted from the composite received signal unreliable. For example, if the signal conveys data, the data error rate can be degraded, especially for high bit rate transmission, and if the signal is used for range estimation, the accuracy of the range estimate can be degraded. If the multipath properties of the radio signal can be characterised, the detrimental effects of multipath propagation can be reduced, for example by cancelling out unwanted reflections or by combining the signal received via different paths in a constructive manner. Also there are systems that use multi-element antennas (MEA) to achieve very high bit rate transmission. Such systems employ a characterisation of the multipath properties of the radio signal. An MEA system is described in "Layered Space-Time Architecture for Wireless Communication in a Fading Environment When Using Multi-Element Antennas", G. J. Foschini, Bell Systems Technical Journal, Autumn 1996, pp. 41–59.

One approach to characterising multipath propagation is the use of parameter estimation techniques such as the Multipath Estimating Delay-Lock Loop (MEDLL) (see, for example, "Performance Evaluation of the Multipath Estimating Delay Lock Loop", B. Townsend, D. J. R. van Nee, P. Fenton, and K. Van Dierendonck, Proc of the Institute of Navigation National Technical Meeting, Anaheim, Calif., Jan. 18–20, 1995, pp. 227–283) and the Minimum-Mean-Square-Estimator (MMSE) (see, for example, "Conquering Multipath: The GPS Accuracy Battle", L. R. Weill, GPS World, April 1997). In parameter estimation techniques, the received signal is represented by a mathematical model, for example a model that includes variable parameters representing the amplitude, phase and delay of the signal components received via a plurality of propagation paths, and the parameter values are adjusted iteratively until a good match is obtained between the received signal and the mathematical model.

Parameter estimation techniques can result in accurate characterisation of a multipath radio signal, but suffer from the disadvantage of being computationally intensive.

It is an objective of the present invention to provide an improved radio station for receiving multipath radio signals.

According to the invention there is provided a radio station, comprising means for receiving a first radio signal propagated via a direct path and via at least one reflected path, means for generating a model of the received first radio signal wherein the model comprises at least one parameter and a value representative of the perpendicular distance between the plane of a reflecting surface and the radio station, means for estimating the value of the or each parameter, and means for exploiting at least one such estimated parameter value.

In an environment where there is more than one reflected path, the model may comprise a plurality of values each representative of the perpendicular distance between the plane of a reflecting surface and the radio station.

The perpendicular distance between the plane of each reflecting surface and the radio station may be determined by transmitting from the radio station a second radio signal and measuring the or each round trip delay of the or each reflection. In this specification the second radio signal is referred to as the sounding signal.

If the or each perpendicular distance is determined dynamically when required, the radio station may be a mobile device.

Instead of using a sounding signal to determine the perpendicular distance between the plane of a reflecting surface and the radio station, the or each perpendicular distance can be pre-determined, for example during installation of a static radio station, and stored ready for use when required. In the latter case, the perpendicular distance should be determined for one or more of the dominant reflectors which, in the case of an office environment, are likely to be the walls. Whether the radio station is mobile or fixed, the device transmitting the first radio signal may be mobile.

The or each value representative of the perpendicular distance between the plane of a reflecting surface and the radio station may be included in the model directly, or indirectly within a bound applied to a parameter of the model.

The inclusion in the model of at least one value representative of the perpendicular distance between the plane of a reflecting surface and the radio station enables a reduction in the amount of computation required to calculate the model parameter or parameters. The reduction in computation results from a reduction in the number of parameters in the model, or from applying a bound to constrain the value of a parameter, or from the use of parameters whose values can be estimated initially from the received first signal or sounding signal, in which case the parameter estimation process can start with parameters closer to their final values. Conversely, for a given amount of computation, the accuracy of the parameter estimation can be increased, for example by including more reflecting surfaces in the model. When only a subset of reflections is selected for inclusion in the model, preference should be given to including the reflections having largest received amplitude, for example, in an office environment, the reflections off walls.

The amount of computation can be reduced also by including in the model, either directly or within a bound, the reflectivity of one or more of the reflecting surfaces. In buildings, this value may be known due to the similarity of materials used in like buildings, for example offices or warehouses. Also the reflectivity may be similar for each dominant reflecting surface.

The amount of computation can be reduced also by including in the model, either directly or within a bound, the amplitude of the received sounding radio signal transmitted by the radio station for measuring the perpendicular distance between the plane of at least one reflecting surface and the radio station. This data inherently includes data about the reflectivity of the reflecting surface.

An example of a parameter of the model is a parameter representative of the distance travelled by the first radio signal received via the direct path. For example a parameter representing the direct path flight time would implicitly represent the distance travelled at the speed of light.

Another example parameter is a parameter representative of the angle of arrival (as defined below) or the received amplitude of the first radio signal received via the direct path, or a parameter representative of the amplitude of the sounding signal backscatter.

The parameter values resulting from the parameter estimation process characterise the multipath propagation and may be exploited in a variety of ways. For example they can assist equalisation of a received signal to reduce bit error rate, they can provide an estimate of the distance of the source of transmission of the first radio signal from the radio station, useful in locating radio equipped objects and people, and they can be used in the demodulation of signals.

The invention will now be described, by way of example only, with reference to the accompanying drawings wherein.

In the drawings the same reference numerals have been used to indicate corresponding features.

The example embodiment of the invention is described below in the context of its application to a radio ranging system in which a radio station estimates the distance of a target station from which it receives a radio signal.

Figure 1:
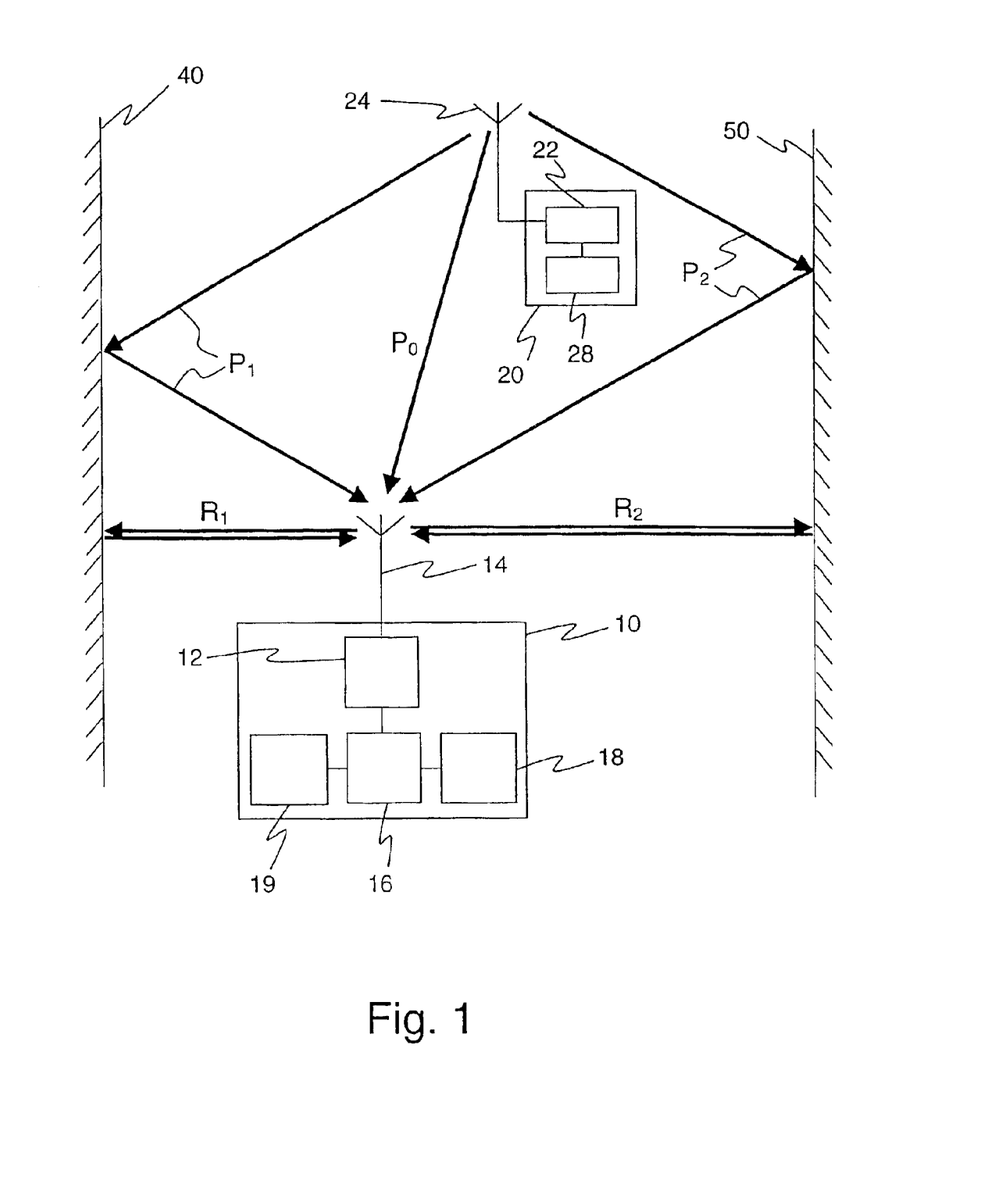
FIG. 1 is a block schematic diagram of a radio system in a multipath environment.

Referring to FIG. 1, there is illustrated a radio station 10 comprising a first transceiver 12 coupled to a first antenna 14 and to a processing means 16. Coupled to the processing means is a first clock 18 and a storage means 19. The storage means 19 is used by the processing means for temporary storage of data. Also in FIG. 1 there is a target station 20 comprising a second transceiver 22 coupled to a second antenna 24 and also coupled to a second clock 28. The first and second clocks 18, 28 are synchronised. Methods of synchronisation are well known and are not described in this specification. Both the radio station 10 and target station 20 are mobile devices. Both transceivers 12, 22 are equipped to communicate using spread spectrum signalling. Also illustrated in FIG. 1 are first and second reflecting surfaces 40, 50 which may be, for example, walls.

When the distance of the target station 20 from the radio station 10 is to be measured, the processing means 16 initiates the transmission of a sounding signal by the first transceiver 12 and first antenna 14. The sounding signal is reflected off the reflecting surfaces 40, 50 and is received back at the first transceiver 12 where the received sounding signal is passed to the processing means 16. In FIG. 1 the reflection off the first reflecting surface 40 is denoted $R_1$ and the reflection off the second reflecting surface 50 is denoted $R_2$. Using the first clock 18 as a time reference, the processing means 16 estimates the delay between transmitting the sounding signal and receiving the reflections $R_1$, $R_2$ of the sounding signal from the first and second reflecting surfaces 40, 50. The value of each of these delays is denoted $T_1$ and $T_2$ respectively. The reflections may be detected by correlation of the received sounding signal with a replica of the transmitted sounding signal. The measurement of delays may be assisted, particularly when there is more than one reflected path, by calculating the times at which the second order derivative of the correlation function of the received sounding signal peaks.

Figure 2:
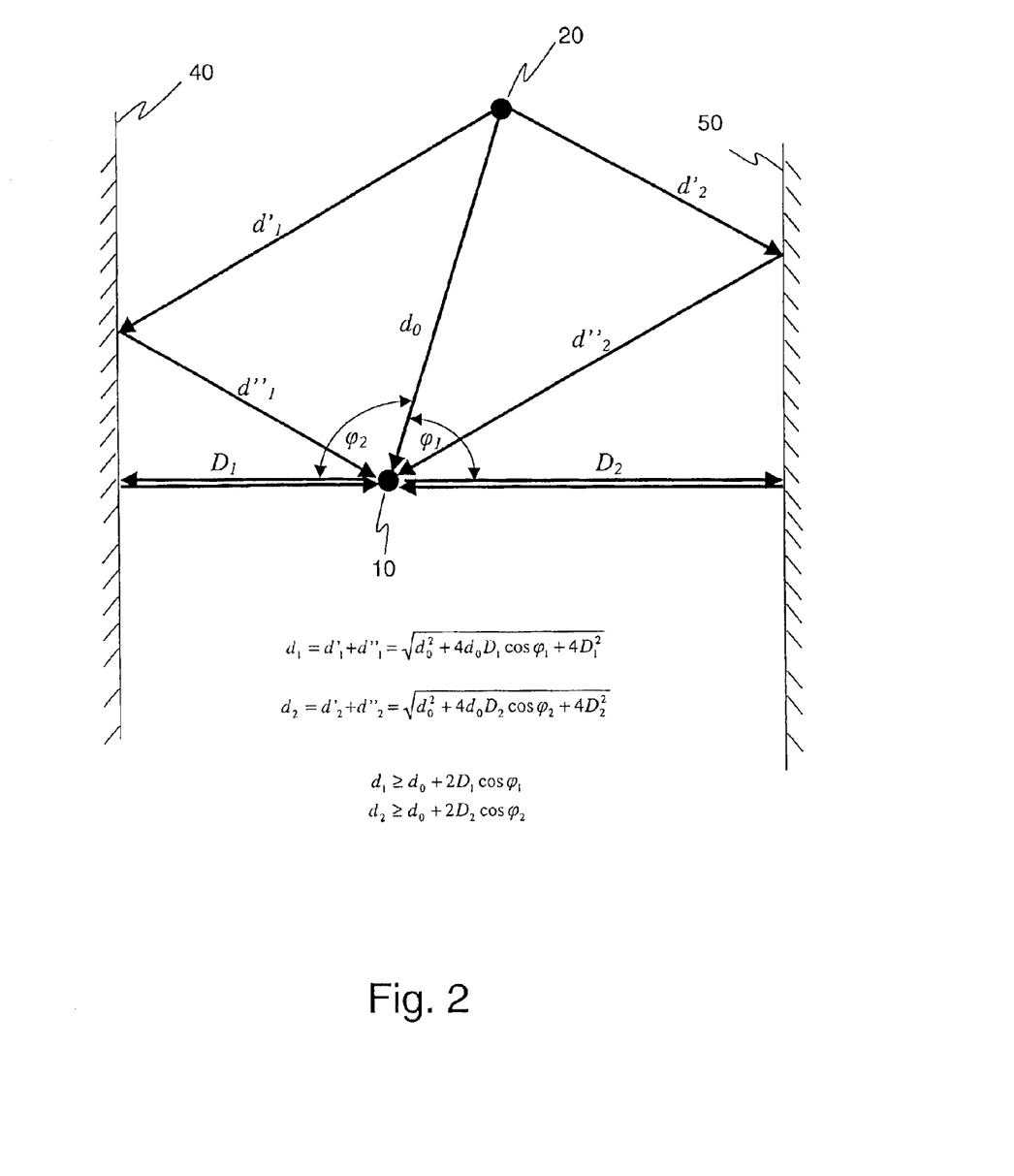
FIG. 2 is a diagram illustrating the geometry of the multipath propagation scenario of FIG. 1.

Referring now to FIG. 2, there is shown the same multipath scenario as in FIG. 1 but with the distances annotated. From the estimated delays $T_1$ and $T_2$ the processing means 16 estimates the distance, from the radio station 10 to each of the reflecting surfaces; $D_1 = c.T_1$ and $D_2 = c.T_2$ where c is the speed of light. These distances are determined perpendicular to the reflecting surface.

In the present embodiment, the sounding signal serves a dual purpose. In addition to enabling the distances $D_1$, $D_2$ to be estimated, the sounding signal is received by the target station 20. In response to receiving the sounding signal, the target station 20 transmits a first radio signal, which in the present specification is referred to as the ranging signal. The ranging signal reaches the radio station 10 via three paths; a direct path, a reflection off the first reflecting surface 40, and a reflection off the second reflecting surface 50. These three paths are denoted $P_0$, $P_1$ and $P_2$ respectively in FIG. 1. The processing means 16 performs an analysis of the received ranging signal in order to produce an estimate of the distance of the target station 20 from the radio station 10. This analysis comprises generating a mathematical model of the received ranging signal which includes parameters representing the various signal components received via the direct path and the reflected paths. Such a model can be expressed as:

$$r(t) = \sum_{k=0}^{K} a_k p\left(t - \frac{d_k}{c}\right) e^{j(\omega t + \theta_i)} \quad (1)$$

where c is the speed of light,

ω is the carrier frequency of the first signal, p(t) is a spreading signal of the first signal transmitted at time t, k=0 for the direct path and k>0 for the at least one reflected path, K is the number of reflected signal paths represented in the model, $a_k$ is the amplitude of the ranging signal received via the $k^{th}$ path, $d_k$ is the distance travelled by the ranging signal received via the $k^{th}$ path (in the present scenario, as illustrated in FIG. 2, $d_1 = d'_1 + d''_1$ and $d_2 = d'_2 + d''_2$), and $\theta_k$ is the phase of the ranging signal received via the $k^{th}$ path.

Equivalently, $d_k/c$ can be represented by $\tau_k$, the propagation delay of the ranging signal received via the $k^{th}$ path.

The value of K is at least one. Ideally each of the large-scale reflectors are represented. The more reflected signal paths that are represented, the greater the accuracy of the model can be.

Parameter estimation techniques such as MEDLL or MMSE referred to above are used to find values of the parameters $a_k$, $d_k$, and $\theta_k$ which result in the model of equation 1 matching the received ranging signal within a predetermined target. The predetermined target can be, for example, a specific maximum acceptable value of the mean-square error between the received ranging signal and the model, in which case the target is achieved when the value of the mean-square error is at or less than the maximum acceptable value. As another example, the predetermined target can be minimisation of the mean-square error, in which case the target is achieved when the mean-square error reaches a minimum value. As another example, the predetermined target may be a predetermined accuracy in the value of a parameter that will be exploited by the radio station 10.

According to the invention, a value representative of the perpendicular distance $D_k$ between the plane of at least one reflecting surface 40, 50 and the radio station 10 is included in the model, either directly or indirectly. It is included directly by replacing one or more of the parameters $a_k$ and $d_k$ by a function of $D_k$, or it is included indirectly by applying one or more bounds to one or more of the parameters $a_k$ and $d_k$, the bounds being a function of $D_k$.

Below are ten functions that apply to the reflected signal paths i.e. k>0. The skilled person may derive additional or alternative functions.

Figure 3:
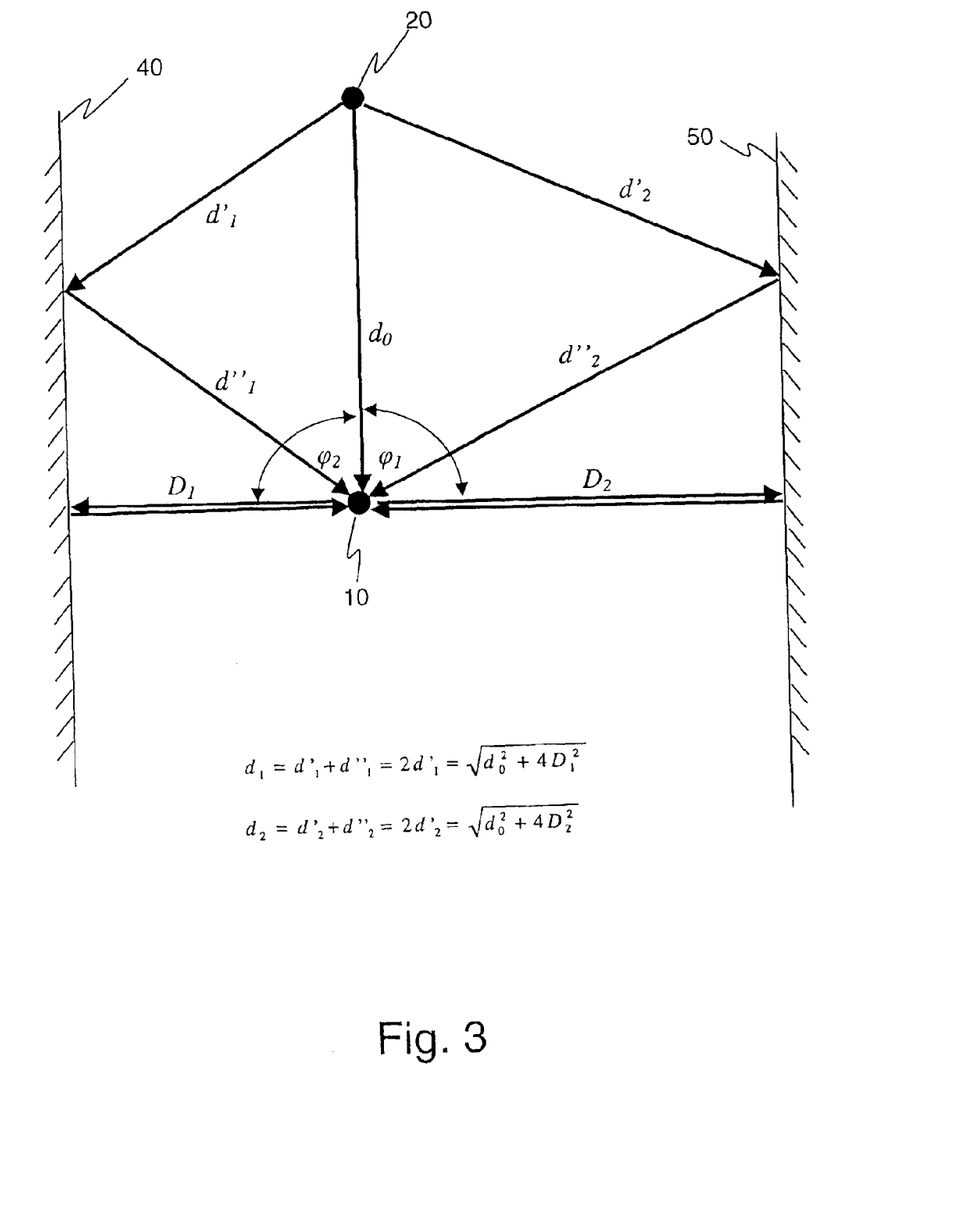
FIG. 3 is a diagram illustrating multipath geometry when the direct propagation path is parallel to a reflecting surface.

Analysis of the multipath geometry illustrated in FIG. 2 shows that the distance travelled by the ranging signal received via the $k^{th}$ path can expressed as $$d_k = \sqrt{d_0^2 + 4d_0 D_k \cos\varphi_k + 4D_k^2}, \text{ for } k>0 \quad \text{Function 1}$$

where $\phi_k$ is the angle of arrival of the ranging signal received via the direct path. The angle of arrival $\phi_k$ is defined as the angle between the direct path and a line perpendicular to the $k^{th}$ reflecting surface, such that the angle is not intersected by the $k^{th}$ reflected path, as shown in FIGS. 2 and 3.

Figure 4:
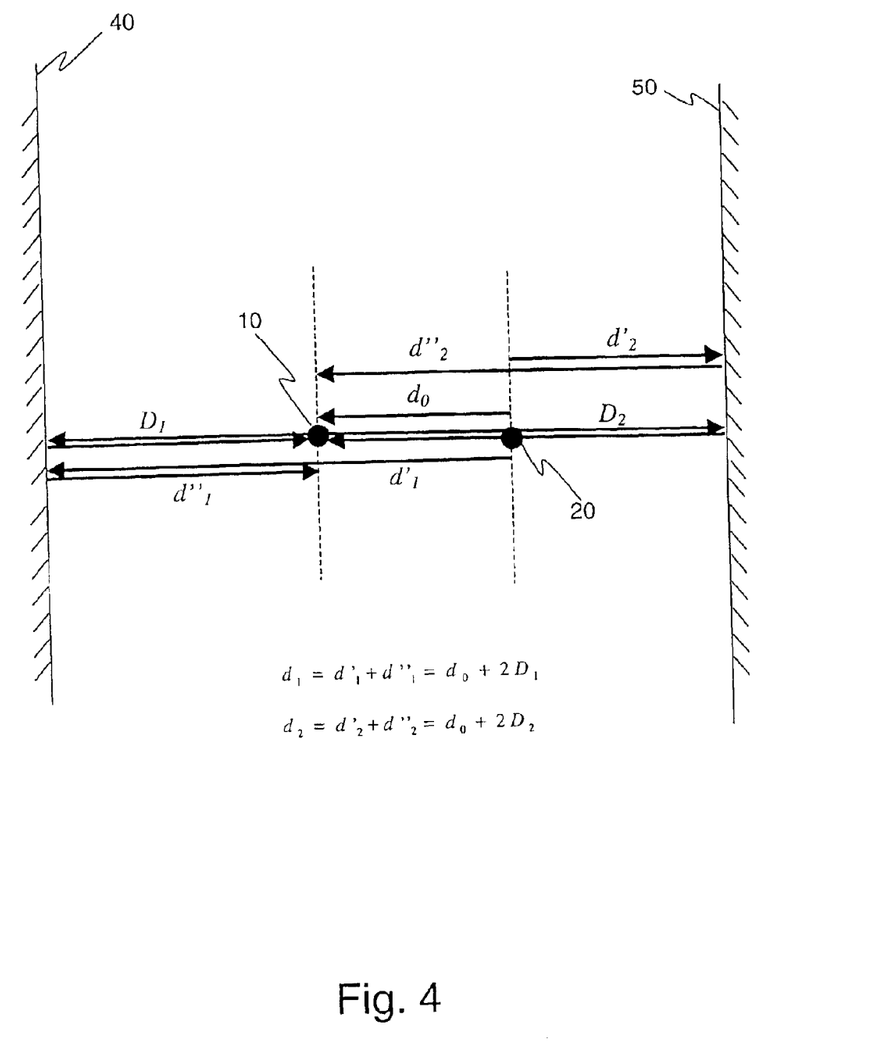
FIG. 4 is a diagram illustrating multipath geometry when the direct propagation path is perpendicular to a reflecting surface.

The maximum value of $d_k$ occurs when $\phi_k$ is zero, i.e. the direction of propagation of the specular reflection from the target station to the radio station is perpendicular to the $k^{th}$ reflecting surface. This scenario is illustrated in FIG. 4 from which it can be shown that the maximum value of $d_k$ can be expressed as $$d_k \leq d_0 + 2D_k \quad \text{Function 2}$$

The minimum value of $d_k$ occurs when $\phi_k$ is 90°, i.e. the direction of propagation of the specular reflection from the target station to the radio station is parallel to the $k^{th}$ reflecting surface. This scenario is illustrated in FIG. 3 from which it can be shown that the minimum value of $d_k$ can be expressed as $$d_k \geq \sqrt{d_0^2 + 4D_k^2} \quad \text{Function 3}$$

Referring to FIG. 2, the minimum value of $d_k$ can also be expressed as $$d_k \geq 2D_k \quad \text{Function 4}$$

The minimum value of this bound corresponds to a co-located radio station 10 and target station 20.

Assuming the generally accepted inverse square propagation law, the amplitude $a_k$ of the ranging signal received via the $k^{th}$ path for k>0, is proportional to the amplitude A of the transmitted ranging signal, is inversely proportional to $d_k^2$, and is also proportional to the reflectivity $\mu_k$ of the $k^{th}$ reflecting surface, i.e.

$$a_k = \frac{A\mu_k}{d_k^2} \quad (2)$$

Similarly, the amplitude $a_{b_k}$ of the sounding signal received back from the $k^{th}$ reflector, referred to as the back-scatter, is $$a_{b_k} = \frac{B\mu_k}{4D_k^2} \text{ for } k > 0 \quad (3)$$

where B is the amplitude of the transmitted sounding signal. By combining equations (2) and (3) the reflectivity $\mu_k$ of the reflecting surface is eliminated and $a_k$ may be expressed as $$a_k = \frac{a_{b_k} 4D_k^2}{d_k^2} \cdot \frac{A}{B} \quad (4)$$

The values of $a_{b_1}$ and $a_{b_2}$ may be estimated by measuring the amplitude of the received sounding signal at times $T_1$ and $T_2$ respectively.

By substituting the expression of Function 1 into equation (4) the following expression for $a_k$ is obtained:

$$a_k = \frac{a_{b_k} 4D_k^2}{d_0^2 + 4d_0 D_k \cos\varphi_k + 4D_k^2} \cdot \frac{A}{B} \quad \text{Function 5}$$

The bound on the maximum value of $d_k$ in Function 2 can be combined with equation (4), resulting in the following expression for the minimum value of $a_k$:

$$a_k \geq \frac{a_{b_k} 4D_k^2}{(d_0 + 2D_k)^2} \cdot \frac{A}{B} \quad \text{Function 6}$$

The bound on the minimum value of $d_k$ in Function 3 can be combined with equation (4), resulting in the following bound on the maximum value of $a_k$:

$$a_k \leq \frac{a_{b_k} 4D_k^2}{d_0^2 + 4D_k^2} \cdot \frac{A}{B} \quad \text{Function 7}$$

Assuming an inverse square propagation law, $a_0$ may be expressed as $$a_0 = \frac{A}{d_0^2} \quad (5)$$

Combining equations (2) and (5) yields $$a_k = \frac{\mu_k a_0 d_0^2}{d_k^2} \quad (6)$$

Combining equations (6) and Function 1 yields $$a_k = \frac{\mu_k a_0 d_0^2}{d_0^2 + 4d_0 D_k \cos\varphi_k + 4D_k^2} \quad \text{Function 8}$$

which is independent of $a_{b_k}$ and can be used even when a sounding signal is not used. Commonly, the walls in an office environment are made of materials having a similar reflectivity, in which case a value of $\mu_k$ common for all reflecting surfaces may be assumed.

Combining the bound on the maximum value of $d_k$ in Function 2 with equation (6), results in the following bound on the minimum value of $a_k$:

$$a_k \geq \frac{\mu_k a_0 d_0^2}{(d_0 + 2D_k)^2} \quad \text{Function 9}$$

The bound on the minimum value of $d_k$ in Function 3 can be combined with equation (6), resulting in the following bound on the maximum value of $a_k$:

$$a_k \leq \frac{\mu_k a_0 d_0^2}{d_0^2 + 4D_k^2} \quad \text{Function 10}$$

The following additional function may be applied, although not dependent on the value of $D_k$, if the amplitude $a_0$ of the ranging signal received via the direct path can be estimated from the received ranging signal and if the reflectivity of the reflecting surfaces $\mu_k$ can be estimated:

$$a_k \leq \mu_k a_0 \quad (7)$$

The best functions to apply in any particular situation will depend on several considerations including: the capability of the first transceiver 12 and first antenna 14; the functions that impose the greatest restriction on parameter values; the data that can be most reliably extracted from the received ranging and sounding signals; the functions that reduce the numbers of parameters in the parameter estimation process. For example, the radio station 10 may or may not be equipped to measure the angle of arrival $\phi_k$ of the sounding signal back-scatter. As another example, due to the characteristics of the multipath environment, the radio station 10 may be able to estimate the amplitude $a_{b_\lambda}$ of the sounding signal back-scatter more accurately than it can estimate the amplitude $a_0$ of the ranging signal received via the direct path. In this case the application of Functions 5, 6, or 7 comprising $a_{b_\lambda}$ may result in less computation than the application of Functions 8, 9 or 10 comprising $a_0$, dependent on whether $\mu_k$ has an assumed values or is left as a variable.

Functions 2 and 3 permit the values of parameters $d_k$ for $k>0$ in equation (1) to be restricted to values defined in terms of parameter $d_0$ and the value of $D_k$. The computation is reduced due to the reduced number of parameters and because the values of $d_k$ are constrained. The computation may be further reduced if an initial estimate of the value of do is made from the received ranging signal.

One method of making an initial estimate of the value of $d_0$ is to correlate the received ranging signal with a replica of the transmitted ranging signal to estimate the propagation delay $\tau_0$ of the ranging signal received via the direct path; then $d_0 = c \cdot \tau_0$.

Functions 1, and 5 to 10, permit the values of parameters $d_k$ or $a_k$, for $k>0$, in equation (1) to be restricted to values defined in terms of parameter $d_0$, and the value of $D_k$, but do not reduce the overall number of parameters because these Functions introduce additional parameters. However, computation can be reduced because the values of the additional parameters can be estimated from measurements on the received ranging and/or sounding signals. These additional parameters are: the angle of arrival $\phi_k$ of the ranging signal for Functions 1, 5 and 8; the amplitude of the sounding signal back-scatter $a_{b_\lambda}$ for Functions 5, 6 and 7; and the amplitude of the ranging signal received via the direct path $a_0$ for Functions 8, 9 and 10.

The angle of arrival $\phi_k$ can be estimated by a suitably equipped radio station using known measurement techniques, for example having an antenna array.

The amplitude of the ranging signal received via the direct path $a_0$ may be estimated from measurement of the received ranging signal.

The amplitude of the sounding signal back-scatter $a_{b_\lambda}$ may be estimated from measurement of the received sounding signal.

It is likely that there is a margin of uncertainty in a parameter value estimated from measurement of a received signal, in which case a margin of error should be applied to the Functions, rather than interpreting the Functions precisely. The extent of the margin will be dependent on the quality of the received sounding and/or ranging signal from which the estimate is derived.

If such a parameter estimate cannot be made reliably, for example due to poor resolution of the received sounding and/or ranging signal, then the parameter can be left to vary freely in the parameter estimation process.

Where upper and lower bounds are available on a parameter value, the amount of computation may be reduced by commencing the parameter estimation with a value of the parameter in the region near the mid point between the upper and lower bounds.

Values for the parameters of the model defined by equation (1) can be determined by performing a parameter estimation process with all reflected paths included in the model initially, and by applying one or more Functions to the parameters. Parameter estimation continues until the mean-square error between the model and the received ranging signal has reached the pre-determined target. Alternatively, an iterative process can be used, including initially only one reflected path or a sub-set of reflected paths in the model and using a parameter estimation process to estimate parameter values, and then iteratively including further reflected paths in the model and performing the parameter estimation process again to refine the parameter values. Again, parameter estimation continues until the mean-square error between the model and the received ranging signal has reached the pre-determined target. One or more Functions are applied for at least one iteration.

Figure 5:
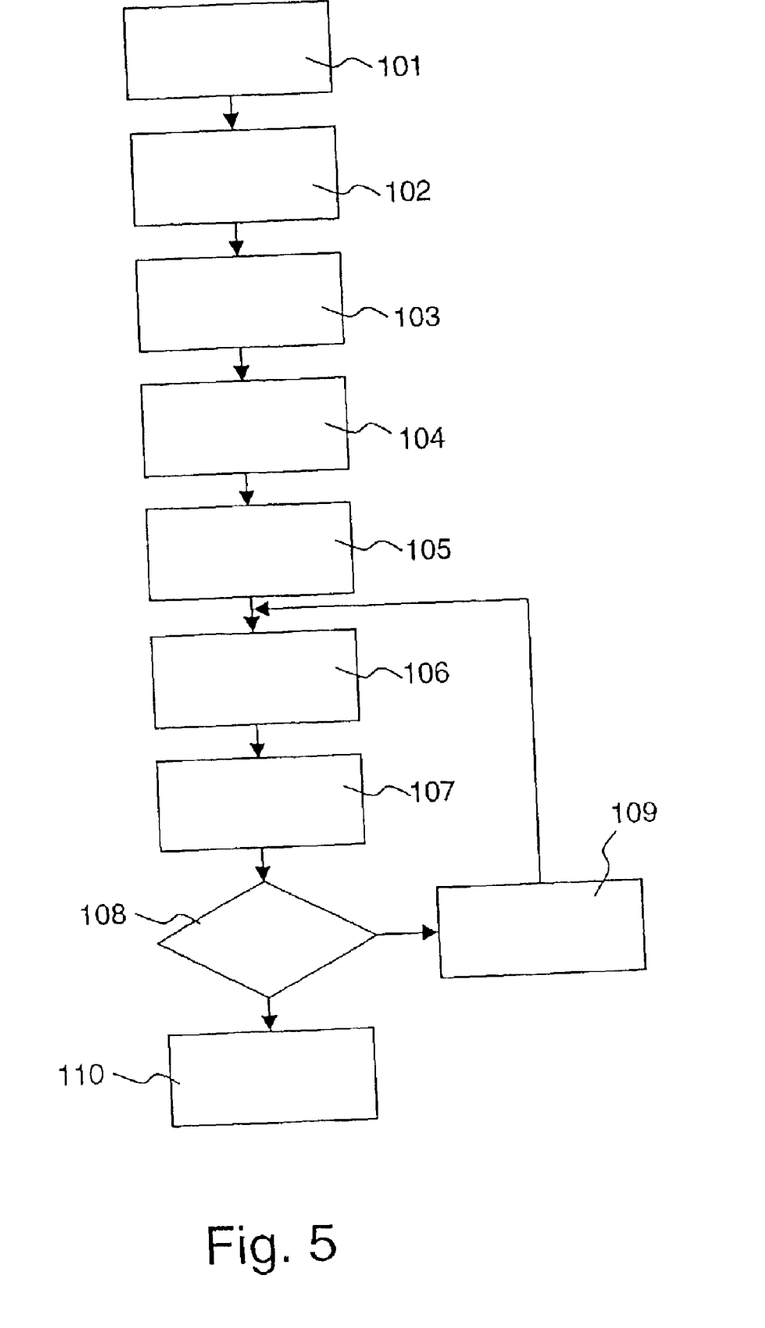
FIG. 5 is a flow chart relating to the operations of the radio station when operating in accordance with an embodiment of the invention.

FIG. 5 is a flow chart illustrating the operations of the radio station 10. The flow chart commences at block 101 in which the radio station 10 transmits the sounding signal and receives reflections from the reflecting surfaces 40, 50. From the received reflections of the sounding signal, in block 102 an estimate of the perpendicular distance $D_k$ between the plane of at least one reflecting surface 40, 50 and the radio station 10 is calculated. Also in block 102, optionally the amplitude $a_{b_\lambda}$ of the sounding signal received back from the $k^{th}$ reflector is estimated for $k>0$. An alternative to blocks 101 and 102, provided the radio station 10 is stationary, is for this perpendicular distance $D_k$ to be pre-estimated and stored in the radio station 10 in readiness for characterising a radio signal, thereby avoiding the requirement for a sounding signal to be transmitted. In block 103 the radio station 10 receives the ranging signal and in block 104 the received ranging signal is analysed to generate an estimated value of one or more of the parameters $a_k$, $d_k$ and $\phi_k$ for $k \geq 0$. In block 105 an initial model of the received signal is selected, using equation (1), comprising the direct path and at least one reflected path. In block 106 Functions are calculated on the parameters of the model, using the one or more estimates calculated in block 104. In block 107 a parameter estimation process is applied to the model whereby the parameter values are varied within the constraints of the Functions resulting from block 106 such that the mean-square error between the model and the ranging signal received in block 103 is minimised. In block 108 the minimum mean-square error is compared against a predetermined target value, and if the mean-square error exceeds the predetermined target value the model is enhanced in block 109 by the addition to the model of parameters representing an additional reflected signal path. Flow then reverts to block 106 where Functions are calculated for the enhanced model. Further parameter estimation takes place in block 107 and when the mean-square error compared in block 108 is smaller than the pre-determined target value, flow passes to block 110 where one or more of the resulting parameter values are exploited. In the present example embodiment, exploitation comprises displaying, or storing for subsequent processing, the value of the parameter $d_0$ which represents the distance of the target station 20 from the radio station 10. For example, the radio station 10 may be a portable device carried by a user and providing the user with an estimate of the range of a second portable device comprising the target station 20. As another example, the radio station 10 may be a portable device carried by a user and functioning as a proximity detector, providing an alert whenever a target station 20 moves beyond, or alternatively within, a prescribed range. Such an application could warn of a child roaming away from a parent, or an object being illegally removed from a building.

Optionally one or more values of the angle of arrival $\phi_k$ may be exploited; in conjunction with $d_0$ the angle of arrival provides sufficient information for the location of the target station 20 to be calculated relative to the radio station 10 and each reflecting surface 40, 50 in two dimensions. For example, in a building the reflecting surfaces 40, 50 may be walls and the location of a device comprising the target station 20 may be calculated relative to the walls and the location of a portable device carried by a user comprising the radio station 10. Such exploitation of parameter values for the purposes of location determination could be performed by the processing means 16.

Optionally, prior to parameter estimation, the received ranging signal or sounding signal may be examined to assess whether its amplitude decay is approximately inversely proportional to time t. This assessment may be performed, for example, by curve fitting. Such a decay is indicative of a large number of randomly positioned reflectors. If the decay is approximately inversely proportional to time, the initial iteration of parameter estimation can be performed with a simplified model in which the reflected signal paths are represented by an expression of the form $\beta/t$, i.e.

$$r(t) = a_0 p\left(t - \frac{d_0}{c}\right) e^{j(\omega t + \theta_0)} + \frac{\beta}{t} \qquad (8)$$

where $\beta$ is a free parameter. The representations in equation (1) of the reflected signal paths are added during subsequent iterations of the parameter estimation.

Typically, the first radio signal and the sounding signal may be spread spectrum signals, but other signalling schemes can be used.

Optionally other methods of initiating transmission of the ranging signal may be used. For example, transmission of the ranging signal may be initiated by transmission from the radio station 10 of a signal other than the sounding signal. As another example, the target station 20 may initiate transmission a ranging signal periodically.

Optionally the ranging signal may be transmitted before the sounding signal.

Optionally other models of the received ranging signal may be used. For example, the model may disregard the phase of signal components of the received signal and model only the envelop. Such a model could take the following form:

$$r(t) = \left|\sum_{k=0}^{K} a_k p\left(t - \frac{d_k}{c}\right)\right| \qquad (9)$$

Optionally the reflectivity $\mu_k$ of the reflecting surfaces 40, 50 may be a parameter in the model, in which case the parameter estimation can yield values for the reflectivity $\mu_k$ which can, in conjunction with a data base of reflectivity values for various materials, can be exploited to determine the material of the reflecting surfaces 40, 50. Such knowledge of the material can provide supplementary information to aid identification of the location of the target station 20.

Another example of exploiting at least one parameter value resulting from the parameter estimation process is the use of such values in equalisation of a multipath signal which may be performed by the processing means 16. The values of parameters $a_k$, $d_k$ (or equivalently $\tau_k$) and $\theta_k$ characterise the components of a multipath signal and either the characterised components can be combined coherently to produce a composite signal that can be demodulated with increased reliability, or components can be removed to enable the remaining component or components to be demodulated with reduced interference from the removed components.

What is claimed is:

1. A radio station, comprising means for receiving a first radio signal propagated via a direct path arid via at least one reflected path, means for generating a model of the received first radio signal wherein the model comprises at least one parameter and a value representative of the perpendicular distance between the plane of a reflecting surface and the radio station, means for estimating the value of the or each parameter, and means for exploiting at least one such estimated parameter value.

2. A radio station as claimed in claim 1, comprising means for transmitting a second radio signal, means for receiving the second radio signal reflected back to the radio station by the reflecting surface, means for measuring the round trip delay of the second radio signal, and means for generating from the round trip delay the value representative of the perpendicular distance between the plane of the reflecting surface and the radio station.

3. A radio station as claimed in claim 1, comprising means for including within a bound applied to a parameter valve the value representative of the perpendicular distance between the plane of the reflecting surface and the radio station is included.

4. A radio station as claimed in claim 1, wherein the model comprises a parameter representative of the distance travelled by the first radio signal received via the direct path.

5. A radio station as claimed in claim 1, wherein the model comprises a parameter representative of the received amplitude of the first radio signal received via the direct path.

6. A radio station as claimed in claim 1, wherein the model comprises a parameter representative of the angle of arrival at the first, radio signal received via the direct path.

7. A radio station as claimed in claim 1, wherein the model includes a value representative of the received amplitude of the received second radio signal.

8. A radio station as claimed in claim 1, wherein the model includes a value representative of the distance travelled by the first radio signal received via the at least one reflected path.

9. A radio station as claimed in claim 1, wherein the model includes a value representative of the reflectivity of the reflecting surface.

10. A radio station as claimed in claim 3, wherein the at least one parameter to which the bound is applied is representative of the distance travelled by the first radio signal received via the at least one reflected path.

11. A radio station as claimed in claim 3, wherein the at least one parameter to which the bound is applied is representative of the received amplitude of the first radio signal received via the at least one reflected path.

12. A radio station as claimed in claim 1, wherein one such exploited parameter value is representative of the range of the radio station from the source of transmission of the first radio signal.

13. A radio station as claimed in claim 1, wherein one such exploited parameter value is representative of the received amplitude of the received second radio signal.

14. A radio station as claimed in claim 1, wherein one such exploited parameter value is representative of the distance travelled by the first radio signal received via the at least one reflected path.

15. A radio station as claimed in claim 1, wherein one such exploited parameter value is representative of the angle of arrival of tho first radio signal received via the direct path.

16. A radio station as claimed in claim 1, wherein the means for exploiting comprises means for equalisation of a received radio signal.

17. A radio station as claimed in claim 2, wherein the means for exploiting comprises means for range determination.

18. A radio station as claimed in claim 1, wherein the means for exploiting comprises means for location determination.

* * * * *